(12) United States Patent
Haussmann (10) Patent No.: US 9,676,291 B2
(45) Date of Patent: Jun. 13, 2017

(54) REFRIGERANT DISTRIBUTOR FOR A HYBRID OR ELECTRIC VEHICLE, AND REFRIGERANT CIRCUIT HAVING A REFRIGERANT DISTRIBUTOR

(71) Applicant: Valeo Klimasysteme GmbH, Bad Rodach (DE)

(72) Inventor: Roland Haussmann, Wiesloch (DE)

(73) Assignee: VALEO KLIMASYSTEME GMBH, Bad Rodach (DE)

( * ) Notice: Subject to any disclaimer, the term of this patent is extended or adjusted under 35 U.S.C. 154(b) by 184 days.

(21) Appl. No.: 14/526,770

(22) Filed: Oct. 29, 2014

(65) Prior Publication Data
US 2015/0118538 A1    Apr. 30, 2015

(30) Foreign Application Priority Data

Oct. 30, 2013 (DE) ................. 10 2013 111 967

(51) Int. Cl.
*B60L 11/18* (2006.01)
*F25B 39/02* (2006.01)
(Continued)

(52) U.S. Cl.
CPC ...... *B60L 11/1874* (2013.01); *B60H 1/00278* (2013.01); *B60H 1/00571* (2013.01);
(Continued)

(58) Field of Classification Search
CPC ........ F25B 5/02; F25B 41/00; F25B 2500/01; F25B 39/028; F25B 41/003;
(Continued)

(56) References Cited

U.S. PATENT DOCUMENTS

| 3,745,787 A | 7/1973 | Ponziani |
| 2008/0223064 A1* | 9/2008 | Feuerecker ........ B60H 1/00921 62/324.2 |

(Continued)

FOREIGN PATENT DOCUMENTS

WO    WO2011083129    *   7/2011   ............. F25B 41/06

*Primary Examiner* — Muhammad Siddiquee
(74) *Attorney, Agent, or Firm* — Howard & Howard Attorneys PLLC

(57) ABSTRACT

The invention relates to a refrigerant circuit of a hybrid or electric vehicle with a refrigerant distributor and to a refrigerant distributor (10) with an inlet channel (12), which extends substantially linearly along an inlet axis (E) and has a channel cross-section ($Q_E$), and at least two outlet channels (14, 16) branching off from the inlet channel (12), which each extend substantially linearly along an outlet axis ($A_1$, $A_2$) and have a channel cross-section ($Q_{41}$, $Q_{42}$), wherein the outlet axis ($A_1$) of a first outlet channel (14) and the outlet axis ($A_2$) of a second outlet channel (16) intersect in a point of intersection (S), and wherein the refrigerant distributor (10) has at least one of the following features:

a) the channel cross-section ($Q_{41}$) of the first outlet channel (14) differs from the channel cross-section ($Q_{42}$) of the second outlet channel (16), b) the point of intersection (S) of the outlet axes ($A_1$, $A_2$) is arranged laterally offset from the inlet axis (E).

14 Claims, 4 Drawing Sheets

(51) Int. Cl.
*F25B 41/00* (2006.01)
*B60H 1/00* (2006.01)
*B60H 1/32* (2006.01)
*H01M 10/625* (2014.01)
*H01M 10/663* (2014.01)
*H01M 10/6568* (2014.01)
*H01M 10/613* (2014.01)
*F25B 5/02* (2006.01)

(52) U.S. Cl.
CPC .............. *B60H 1/323* (2013.01); *F25B 5/02* (2013.01); *F25B 41/00* (2013.01); *H01M 10/613* (2015.04); *H01M 10/625* (2015.04); *H01M 10/6568* (2015.04); *H01M 10/663* (2015.04); *B60H 2001/00307* (2013.01); *F25B 39/028* (2013.01); *F25B 41/003* (2013.01); *F25B 2500/01* (2013.01)

(58) Field of Classification Search
CPC .............. H01M 10/613; H01M 10/625; H01M 10/663; H01M 10/6568; H01M 10/61; B60L 11/1874; B60H 1/00278; B60H 1/00571; B60H 1/323
See application file for complete search history.

(56) References Cited

U.S. PATENT DOCUMENTS

| | | | |
|---|---|---|---|
| 2010/0293980 A1* | 11/2010 | Shimaoka | F25B 39/028 62/259.1 |
| 2011/0174004 A1* | 7/2011 | Heckenberger | B60H 1/00278 62/222 |
| 2012/0145246 A1* | 6/2012 | French | F25B 39/028 137/1 |
| 2013/0042643 A1* | 2/2013 | Haussmann | F25B 41/062 62/299 |
| 2013/0087204 A1* | 4/2013 | Beard | F25B 39/028 137/1 |

* cited by examiner

REFRIGERANT DISTRIBUTOR FOR A HYBRID OR ELECTRIC VEHICLE, AND REFRIGERANT CIRCUIT HAVING A REFRIGERANT DISTRIBUTOR

CROSS-REFERENCE TO RELATED APPLICATIONS

This application claims priority to and all the advantages of German Patent Application No. DE 102013111967.0, filed on Oct. 30, 2013, the content of which is incorporated herein by reference.

The invention relates to a refrigerant distributor of a motor vehicle, comprising an inlet channel which extends substantially linearly along an inlet axis and has an inlet cross-section, and at least two outlet channels branching off from the inlet channel, which each extend substantially linearly along an outlet axis and have an outlet cross-section, wherein the outlet axis of a first outlet channel and the outlet axis of a second outlet channel intersect in a point of intersection.

Moreover, the invention also comprises a refrigerant circuit of a hybrid or electric vehicle having a refrigerant distributor.

BACKGROUND

Refrigerant distributors for refrigerant circuits have already been known in general for many years from the prior art and are used, in particular, in air conditioning systems of motor vehicles.

Thus, for example, U.S. Pat. No. 3,745,787 discloses a refrigerant distributor of the generic type which is arranged between an expansion valve and an evaporator of a vehicle air conditioning system. A refrigerant of the air conditioning system is usually present in the region of the refrigerant distributor as a liquid/gas mixture and is customarily to be distributed by way of the refrigerant distributor to individual sections of the evaporator in a manner which is as uniform as possible both in relation to the liquid phase and in relation to the gas phase. In order to achieve this, a baffle face is provided at the inlet opening of the inlet channel, which baffle face is to ensure turbulence in the liquid/gas mixture and is correspondingly to ensure distribution of the refrigerant to the outlet channels of the refrigerant distributor in a manner which is as uniform as possible.

Particularly uniform refrigerant distribution to the individual sections of the air conditioning system evaporator advantageously ensures a high cooling capacity of the evaporator. However, certain distribution inhomogeneities, for example as a result of thermal conduction within the evaporator or a suitable addition of fresh air, can be compensated for without relatively great problems or technical disadvantages.

In contrast, the cooling of high-performance accumulators or batteries in hybrid or electric vehicles presents disproportionately greater technical challenges for the refrigerant circuit in the motor vehicle.

In contrast to the climate control of the interior compartment of the vehicle, cooling of the drive battery is necessary even at low ambient temperatures (down to approximately −10° C.). At low ambient temperatures of this type, in some circumstances the refrigerant in the region of the refrigerant distributor is completely in its liquid phase, and the refrigerant circuit has only very low pressure differences of the order of magnitude of approximately 1 bar between the high pressure region and the low pressure region.

Otherwise, the performance and service life of the accumulators or batteries is greatly dependent on the temperature, with the result that particularly reliable and homogeneous cooling to a temperature which is as constant as possible is very important.

Furthermore, the drive battery of a hybrid or electric vehicle is frequently divided into a plurality of separate drive battery modules which are assigned in each case one evaporator. As a consequence, the individual evaporators are structurally separated from one another, with the result that thermal equalization via thermal conduction cannot take place.

Accordingly, in refrigerant circuits of hybrid or electric vehicles, uniform distribution is not necessarily desirable and technically advantageous, but rather individually adaptable distribution of the refrigerant to sections of the refrigerant circuit which are connected in parallel.

SUMMARY OF THE INVENTION

It is an object of the invention to provide a refrigerant distributor, in which the distribution of the refrigerant can be adapted with low outlay to individual boundary conditions of a refrigerant circuit, and to provide a refrigerant circuit for hybrid or electric vehicles, in which refrigerant circuit branch conduits of the refrigerant circuit which are connected in parallel have a refrigerant distribution which can be adapted individually with little outlay.

According to the invention, this object is achieved by way of a refrigerant distributor of the type mentioned at the outset, wherein the refrigerant distributor has at least one of the following features:
a) the outlet cross-section of the first outlet channel differs from the outlet cross-section of the second outlet channel;
b) the point of intersection of the outlet axes is arranged laterally offset from the inlet axis.

The refrigerant distribution can be adapted via said simple geometric parameters of the refrigerant distributor with little technical outlay, wherein, for example, a mounting angle of the refrigerant distributor and/or different cooling capacity requirements can be taken into consideration in the individual branch conduits which are connected in parallel.

All outlet channels preferably radially branch off from an axial end of the inlet channel. As a result, an extremely compact refrigerant distributor is produced which has a low installation space requirement. In particular, precisely two outlet channels are provided, with the result that the channels of the refrigerant distributor form a Y-shape.

Here, the inlet cross section of the inlet channel preferably has an inlet diameter $d_E$ with 4 mm $\leq d_E \leq$ 8 mm.

Furthermore, each outlet channel extends from a branching point to an outlet port and preferably has a substantially constant channel cross-section.

In one embodiment of the refrigerant distributor, the channel cross-section $Q_{A1}$ of the first outlet channel differs from the channel cross-section $Q_{A2}$ of the second outlet channel. Via said different cross-sections $Q_{A1}$, $Q_{A2}$ of the outlet channels, different cooling capacity requirements of the connected branch conduits can be taken into consideration with low technical outlay.

In this embodiment, in particular, the first outlet channel can be assigned a first cooling capacity $P_{K1}$ and the second outlet channel can be assigned a second cooling capacity $P_{K2}$ which is different from the first cooling capacity $P_{K1}$, wherein the following applies in essence: $P_{K1}/P_{K2}=Q_{A1}/Q_{A2}$. As long as the cooling capacity requirements in the individual branch conduits are known, this proportional relationship permits simple cross-sectional dimensioning of the outlet channels.

In a further embodiment of the refrigerant distributor, the point of intersection of the outlet axes is spaced apart from the inlet axis, that is to say is offset laterally. This lateral offset leads to asymmetrical refrigerant incident flow of the outlet channels. In this way, undesirable gravitational effects which are produced, for example, when the inlet axis does not extend substantially vertically in the installed state of the refrigerant distributor can be compensated for simply. This type of mounting of the refrigerant distributor in a manner which is pivoted with respect to the vertical or gravity direction is necessary in some circumstances on account of constricted installation space conditions.

In this embodiment of the refrigerant distributor, the point of intersection of the outlet axes preferably has a distance x from the inlet axis, with 0 mm<x≤2 mm.

Furthermore, the inlet channel can have a connecting portion which adjoins an inlet port and a branching portion which adjoins the outlet channels, wherein the connecting portion defines a port cross-section with a port axis and the branching portion defines the channel cross-section narrowed as compared to the port cross-section with the inlet axis. The narrowed channel cross-section with the inlet axis, with respect to which the point of intersection of the outlet axes is arranged laterally offset, therefore does not extend over the entire inlet channel, but merely over the branching portion of the inlet channel. The result of this in the inlet channel is a certain "Venturi effect" which further reinforces the influence of the lateral distance of the point of intersection from the inlet axis on the refrigerant distribution.

Here, the port axis of the connecting portion can extend through the point of intersection of the outlet axes. The channels of the refrigerant distributor are then oriented symmetrically with the exception of the branching portion. In order to compensate for undesirable gravitational effects, merely the branching portion of the inlet channel is arranged eccentrically, with the result that the point of intersection of the outlet axes is spaced apart from the inlet axis of the branching portion.

Here, the branching portion has an axial length $L_V$ and a hydraulic diameter $d_{hydr,V}$ with preferably: 1 mm≤$L_V$≤3 $d_{hydr,V}$. The compensation of the gravitational effect by way of mounting of the refrigerant distributor in a manner which is pivoted with respect to the vertical direction can be carried out particularly effectively by way of the lateral offset of the point of intersection of the outlet axes from the inlet axis if the axial length of the branching portion lies in the above-mentioned range.

In a further embodiment of the refrigerant distributor, the inlet channel extends from an inlet port to a branching point and has a substantially constant channel cross-section.

In this embodiment, the inlet channel has an axial length $L_E$ and a hydraulic diameter $d_{hydr,E}$, preferably with $d_{hydr,E}$ $L_E$≤10 $d_{hydr,E}$. Since an expansion valve of the refrigerant circuit is particularly preferably arranged immediately in front of the inlet channel of the refrigerant distributor, the axial length $L_E$ also corresponds approximately to a distance between the expansion valve and the branching point of the inlet channel.

According to the invention, the object which was set at the outset is also achieved by way of a refrigerant circuit of a hybrid or electric vehicle, comprising at least two evaporators connected in parallel for cooling drive battery modules of the vehicle, which each include a refrigerant inlet and a refrigerant outlet, a refrigerant distributor which forms a branching point with an inlet channel and at least two outlet channels, a refrigerant collector, which forms a branching point with a collector outlet and at least two collector inlets, and at least two branch conduits connected in parallel, which each extend from an outlet channel of the refrigerant distributor to a collector inlet of the refrigerant collector, wherein the evaporators are each connected to an associated branch conduit, and wherein at the inlet and/or outlet of at least one evaporator a flow resistor, in particular an orifice plate or a throttle, is provided for adapting the pressure drop in the associated branch conduit. A different pressure drop in the individual branch conduits, for example as a consequence of different branch conduit lengths, can be compensated for simply by means of a flow resistor of this type, with the result that desired cooling is set in all branch conduits.

In one preferred embodiment of the refrigerant circuit, at the inlet and/or outlet at least one evaporator is connected to the associated branch conduit via an intermediate flange, wherein the flow resistor is integrated into the intermediate flange. In this way, the number of individual components in the refrigerant circuit can be kept low.

The evaporators connected in parallel for cooling the drive battery modules are preferably separate evaporators which constructionally are separate from each other and in particular are thermally decoupled. As a result of the use of an above-described refrigerant distributor and/or at least one flow resistor at the evaporator, the refrigerant distribution in the refrigerant circuit can be set in such a way that the individual battery modules are cooled very precisely to a desired temperature level even when, for example, sufficient thermal conduction between the individual evaporators is not possible.

BRIEF DESCRIPTION OF THE DRAWINGS

Further features and advantages of the invention result from the following description of preferred embodiments with reference to the drawings, in which.

DETAILED DESCRIPTION

Figure 1:
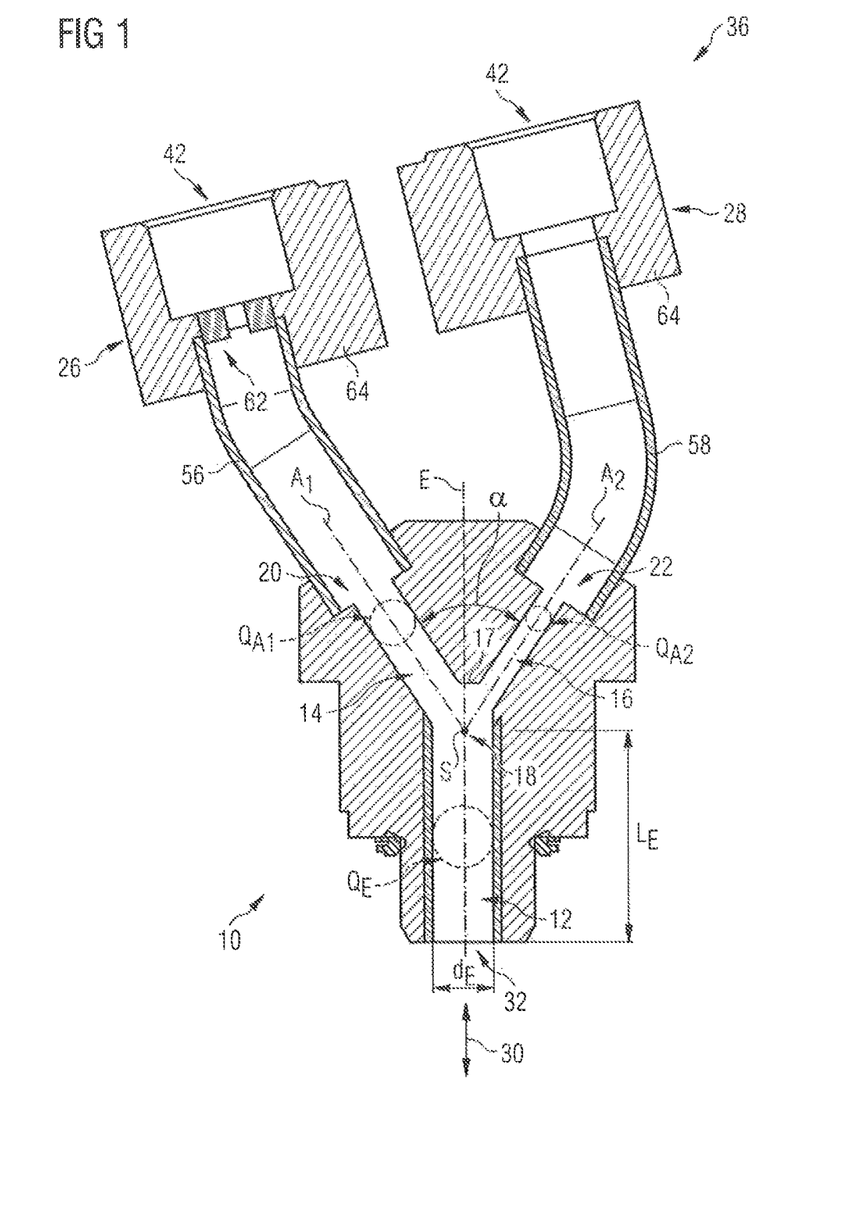
FIG. 1 shows a diagrammatic longitudinal section through a first embodiment of a refrigerant distributor according to the invention in its mounting position.
Figure 2:
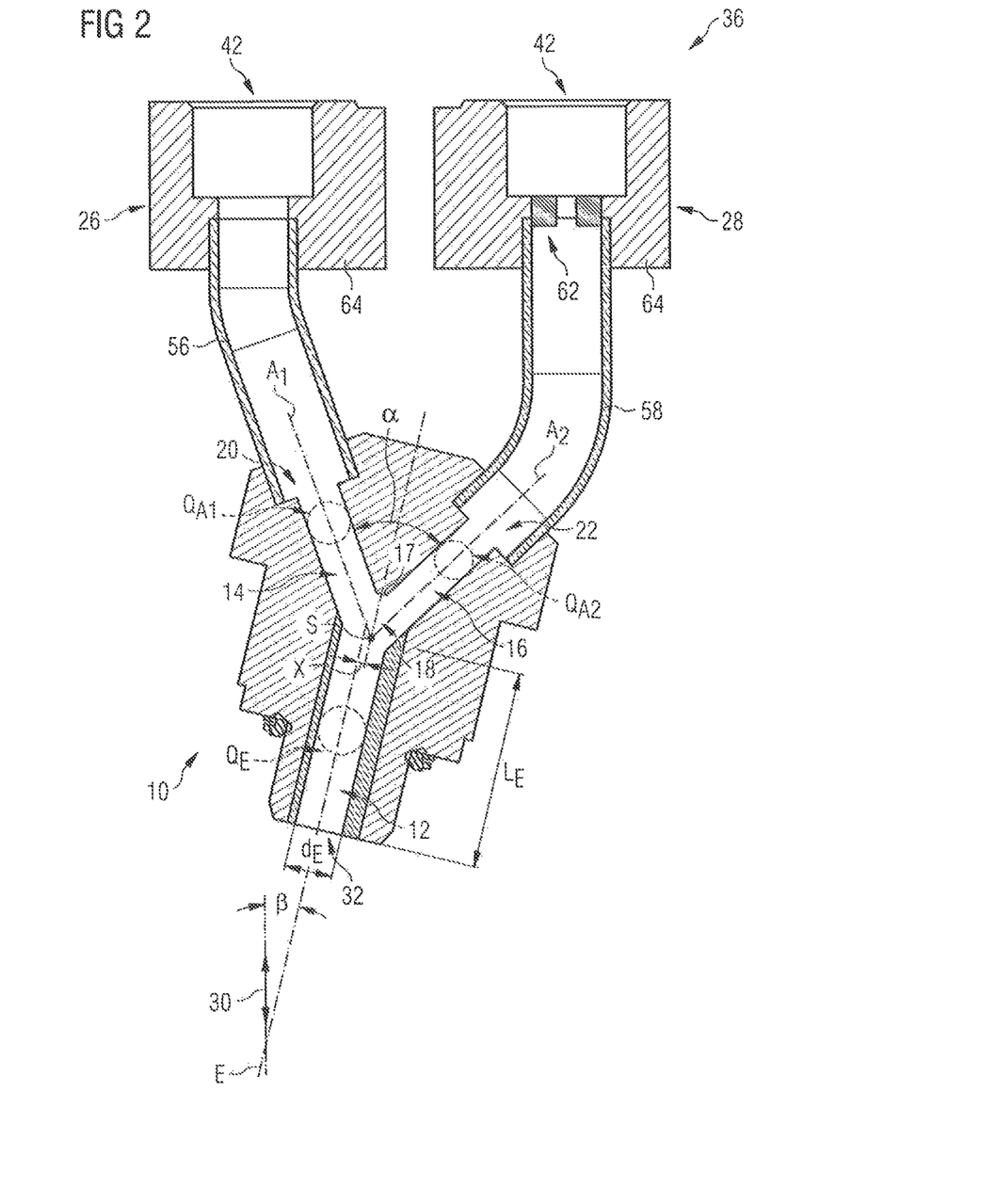
FIG. 2 shows a diagrammatic longitudinal section through a second embodiment of a refrigerant distributor according to the invention in its mounting position.
Figure 3:
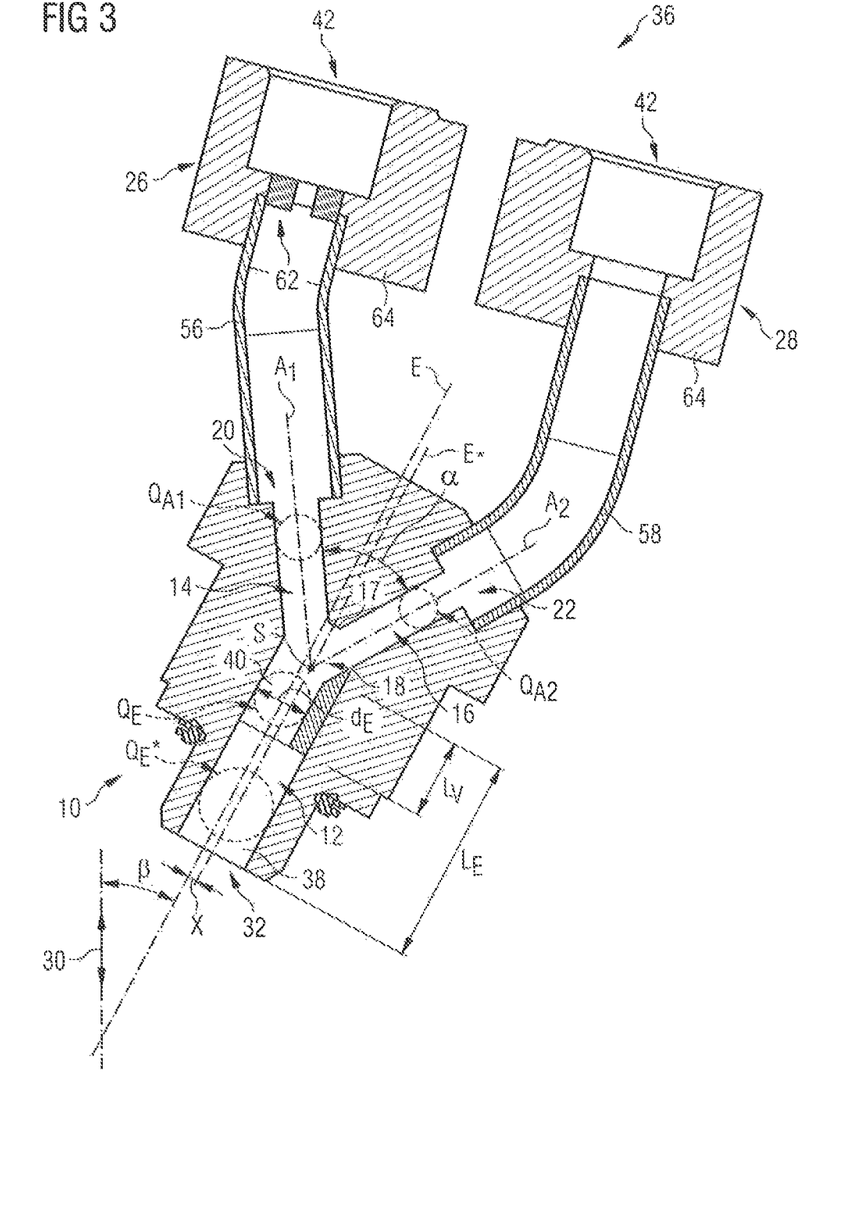
FIG. 3 shows a diagrammatic longitudinal section through a third embodiment of a refrigerant distributor according to the invention in its mounting position.

FIGS. 1 to 3 in each case show a diagrammatic longitudinal section of a refrigerant distributor 10 of a motor vehicle, in particular of a hybrid or electric vehicle, comprising an inlet channel 12 which extends substantially linearly along an inlet axis E and has a channel cross-section $Q_E$, and two outlet channels 14, 16 branching off from the inlet channel 12, which each extend substantially linearly along an outlet axis $A_1$, $A_2$ and have a channel cross-section $Q_{A1}$, $Q_{A2}$, wherein the outlet axis $A_1$ of a first outlet channel 14 and the outlet axis $A_2$ of a second outlet channel 16 intersect in a point of intersection S.

In the exemplary embodiments which are shown, precisely two outlet channels 14, 16 are provided, with the result that the channels 12, 14, 16 of the refrigerant distributor 10 form a Y-shape, wherein the outlet channels 14, 16 are arranged substantially symmetrically with respect to the inlet channel 12 and enclose an angle α where 30°≤α≤100°, in particular α≈60°. A baffle face 17 which is substantially perpendicular with respect to the inlet axis E is provided between the outlet channels 14, 16, with the result that the outlet channels 14, 16 do not run acutely towards one another at the angle α. The baffle face 17 firstly entails advantages in terms of manufacturing technology, but secondly also ensures additional swirling of the refrigerant in the region of a branching point 18 and therefore refrigerant distribution to the outlet channels 14, 16 which can be controlled in an improved manner.

It goes without saying that it is also conceivable in an alternative design variant that more than two outlet channels 14, 16 are provided, for example three outlet channels, wherein the outlet channels are then arranged distributed substantially uniformly in the circumferential direction in relation to the inlet axis E.

At least two, preferably all outlet channels 14, 16 radially branch off from an axial end of the inlet channel 12, which results in an extremely compact geometry of the refrigerant distributor 10. This axial end of the inlet channel 12 defines a branching point 18, wherein each outlet channel 14, 16 extends from the branching point 18 to an outlet port 20, 22 and has a substantially constant channel cross-section $Q_{A1}$, $Q_{A2}$.

A circular channel cross-section $Q_E$ of the inlet channel 12 with an inlet diameter $d_E$ of 4 mm≤$d_E$≤8 mm has proven particularly advantageous for cooling drive battery modules 24 (see FIG. 4) of hybrid or electric vehicles.

FIG. 1 shows the refrigerant distributor 10 according to a first embodiment, in which the channel cross-section $Q_{A1}$ of the first outlet channel 14 differs from the channel cross-section $Q_{A2}$ of the second outlet channel 16. Cooling capacities $P_{K1}$, $P_{K2}$ of the evaporators 26, 28 which are connected to the outlet channels 14, 16 (see FIG. 4) can be influenced with little outlay via the channel cross-sections $Q_{A1}$, $Q_{A2}$, in particular via the ratio of said channel cross-sections $Q_{A1}$, $Q_{A2}$.

For example, a first cooling capacity $P_{K1}$ is assigned to the first outlet channel 14 and a second cooling capacity $P_{K2}$ which is different from the first cooling capacity $P_{K1}$ is assigned to the second outlet channel 16, wherein the following applies in essence: $P_{K1}/P_{K2}=Q_{A1}/Q_{A2}$.

FIG. 2 shows the refrigerant distributor 10 according to a second embodiment, in which the point of intersection S of the outlet axes $A_1$, $A_2$ is arranged spaced apart from the inlet axis E, in particular offset laterally. Here, a lateral offset x of the point of intersection S from the inlet axis E lies in the range 0 mm<x≤2 mm, in particular at x≈1 mm.

A gravitational influence which is produced when the inlet axis E is pivoted by a mounting angle β with respect to the gravity or vertical direction 30 in the mounted state of the refrigerant distributor 10 can be compensated for in a simple way by way of said lateral offset. The refrigerant distributor 10 is preferably configured with a lateral distance x only in the case of a mounting angle β greater than 10°, since the gravitational influence on the refrigerant distribution at mounting angles β<10° is usually negligible.

According to FIG. 1, the refrigerant distributor 10 is fastened to the vehicle in the mounting state which is shown in such a way that the inlet axis E extends substantially in the vertical direction 30, with the result that no lateral offset between the point of intersection S of the outlet axes $A_1$, $A_2$ and the inlet axis E is necessary and all outlet axes $A_1$, $A_2$ intersect with the inlet axis E at the point of intersection S.

If, in comparison with this preferred, vertical mounting position according to FIG. 1, the refrigerant distributor 10 has to be pivoted into a mounting position according to FIG. 2, a greater refrigerant proportion would flow through the second outlet channel 16 than the first outlet channel 14 on account of gravitational effects, in particular in relation to the liquid phase of the refrigerant. In order to compensate for this gravitational effect, according to FIG. 2 the point of intersection S of the outlet axes $A_1$, $A_2$ with respect to the inlet axis E is arranged laterally offset, wherein the distance x at a mounting angle β≈20° with respect to the vertical direction 30 lies in the order of magnitude of x≈1 mm.

According to FIG. 2, the inlet channel 12 extends from an inlet port 32 to the branching point 18 and has a substantially constant and preferably circular channel cross-section $Q_E$. Otherwise, the inlet channel 12 has an axial length $L_E$ and a hydraulic diameter $d_{hydr,E}$, where: $d_{hydr,E} \leq L_E \leq 10\ d_{hydr,E}$.

Since an expansion valve 34 in a refrigerant circuit 36 (see FIG. 4) of the hybrid or electric vehicle is preferably arranged directly at the inlet port 32 of the inlet channel 12 or the refrigerant distributor 10, the axial length $L_E$ also substantially corresponds to the distance between the expansion valve 34 and the branching point 18.

FIG. 3 shows the refrigerant distributor 10 according to a third embodiment which differs from the second embodiment according to FIG. 2 merely in that the inlet channel 12 has a connecting portion 38 which adjoins the inlet port 32 and a branching portion 40 which adjoins the outlet channels 14, 16, wherein the connecting portion section 38 defines a port cross-section $Q_E^*$ with a port axis E* and the branching portion 40 defines the channel cross-section $Q_E$ with the inlet axis E, which channel cross-section $Q_E$ is narrowed with respect to the port cross-section $Q_E^*$. In other words, this means that the inlet channel 12 has an narrowed, preferably circular channel cross-section $Q_E$ merely over part of its axial length $L_E$, and the point of intersection S of the outlet axes $A_1$, $A_2$ is laterally offset with respect to the inlet axis E merely in the region of said branching portion 40. In this case, the lateral distance x between the point of intersection S and the inlet axis E is preferably also 0 mm<x≤2 mm, in particular x≈1 mm.

In the exemplary embodiment according to FIG. 3, the port axis E* of the connecting portion 38 extends through the point of intersection S, with the result that exclusively the inlet axis E of the branching portion 40 is offset laterally with respect to the point of intersection S.

According to FIG. 3, the branching portion 40 has an axial length $L_V$ and a hydraulic diameter $d_{hydr,V}$, where: 1 mm≤$L_V$≤3 $d_{hydr,V}$.

This cross-sectional narrowing directly upstream of the branching point 18 results in a certain "Venturi effect" which ensures additional swirling of the refrigerant in the region of the branching point 18. Compared with the second embodiment of the refrigerant distributor 10 according to FIG. 2, the influence of the lateral distance x on the refrigerant distribution is reinforced in this way, with the result that gravitational effects at relatively large mounting angles β of the refrigerant distributor 10 can also be compensated for without problems. For example, the lateral distance x at a mounting angle of β≈30° lies in the order of magnitude of x≈1 mm.

Figure 4:
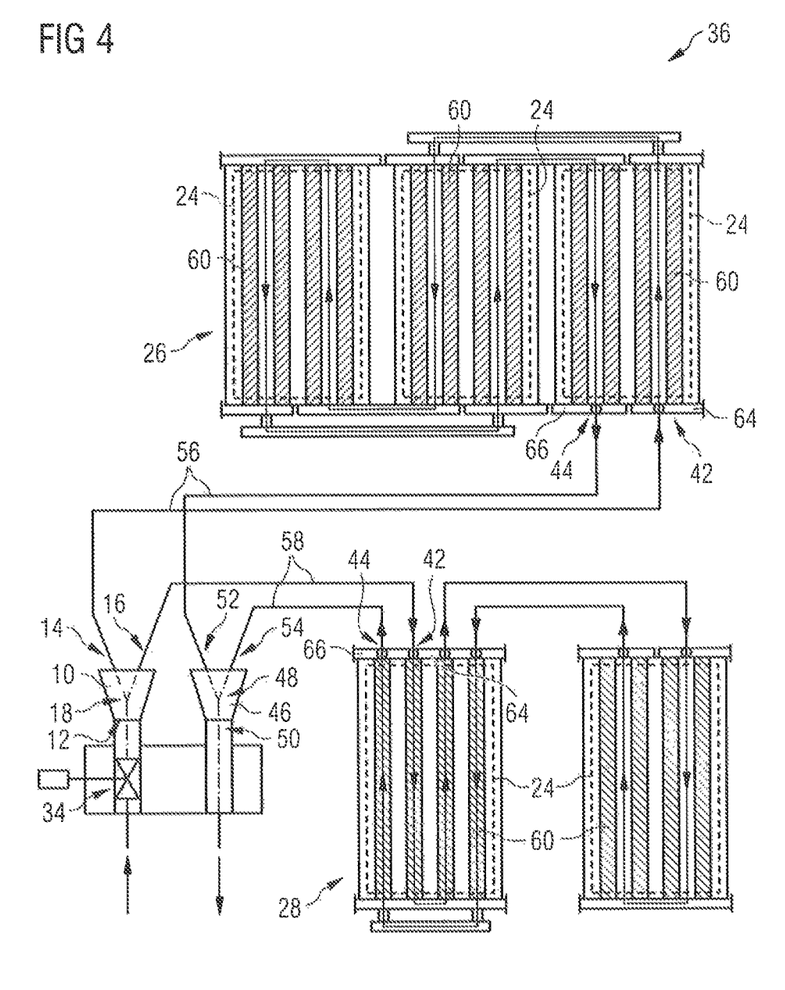
FIG. 4 shows a diagrammatic detail of a refrigerant circuit according to the invention comprising a refrigerant distributor.

FIG. 4 shows details of a refrigerant circuit 36 of a hybrid or electric vehicle, with two evaporators 26, 28 which are connected in parallel for cooling drive battery modules 24 of the vehicle, which evaporators 26, 28 have in each case one refrigerant inlet 42 and one refrigerant outlet 44, a refrigerant distributor 10, in particular according to one of FIGS.

1 to 3, which forms a branching point 18 with an inlet channel 12 and at least two outlet channels 14, 16, a refrigerant collector 46 which forms a branching point 48 with a collector outlet 50 and at least two collector inlets 52, 54, and two parallel branch conduits 56, 58 which extend in each case from an outlet channel 14, 16 of the refrigerant distributor 10 to a collector inlet 52, 54 of the refrigerant collector 46.

Otherwise, the refrigerant circuit 36 can have a further evaporator (not shown) for controlling the climate of a vehicle interior compartment. In this case, a branching piece is connected upstream of the refrigerant distributor 10, which branching piece distributes the refrigerant from a refrigerant main line to a line for climate control of the interior compartment and a line connected in parallel for battery cooling, wherein the line for battery cooling branches further via the refrigerant distributor 10 into the branch conduits 56, 58. Here, the branching piece in the refrigerant mainline can be a simple T-piece, a conventional refrigerant distributor or a refrigerant distributor 10 according to FIGS. 1 to 3.

The evaporators 26, 28 are connected in each case to an associated branch conduit 56, 58, wherein each evaporator 26, 28 within a branch conduit 56, 58 can consist of a plurality of evaporator elements 60 which are connected in series.

As indicated in FIGS. 1 to 3, a flow resistor 62 for adapting the pressure drop in the associated branch conduit 56, 58 is provided on the inlet and/or outlet side of at least one of the evaporators 26, 28.

Here, the flow resistor 62 is, in particular, an orifice plate with a fixed throughflow cross-section or, as an alternative, a throttle valve with a throughflow cross-section which is variable, in particular can be controlled in a variable manner.

In the case of different branch conduit lengths, the associated, different pressure drop in the branch conduits 56, 58 can be compensated for, for example, by virtue of the fact that a flow resistor 62 is provided in the shorter branch conduit 56, 58.

According to FIGS. 1 to 3, the evaporators 26, 28 are connected on the inlet side via an intermediate flange 64 to the associated branch conduits 56, 58, wherein the flow resistor 62 is integrated into the intermediate flange 64.

As an alternative or in addition, it goes without saying that the evaporators 26, 28 can also be connected on the outlet side via an intermediate flange 66 (see FIG. 4) to the associated branch conduits 56, 58, wherein the flow resistor 62 is integrated correspondingly into the intermediate flange 66. The number of individual components in the refrigerant circuit 36 can be kept low as a result of the integration of the flow resistor 62 into the intermediate flange 64, 66.

According to FIG. 4, the evaporators 26, 28 which are connected in parallel for cooling the drive battery modules 24 are separate evaporators 26, 28 which are separate structurally from one another and are decoupled thermally.

In hybrid or electric vehicles, cooling of the drive battery is necessary for safe and reliable driving operation. Here, the service life and performance of the battery is greatly temperature-dependent, with the result that cooling which is as exact as possible to a desired temperature level is advantageous.

The surface to be cooled of the drive battery usually lies in the order of magnitude of approximately 3 m$^2$, with the result that conduit lengths for the refrigerant in the order of magnitude of approximately 5 m can result. The refrigerant circuit 36 is very stagnant as a result and can no longer be controlled sufficiently by way of the expansion valve 34.

Therefore, instead of one long refrigerant conduit, at least two branch conduits 56, 58 which are connected in parallel with conduit lengths of from approximately 2 to 3 m are provided. Here, the cooling in the individual branch conduits 56, 58 is dependent on the mounting angle β of the refrigerant distributor 10 and the length of the branch conduits 56, 58. Furthermore, the cooling capacity $P_{K1}$, $P_{K2}$ is to be adjustable as exactly as possible to the number and/or the cooling requirements of the respectively connected drive battery modules 24, in order that the desired temperature is set at every drive battery module 24.

For safety and installation space reasons, the drive battery of hybrid or electric vehicles is usually divided into a plurality of drive battery modules 24, wherein each drive battery module 24 is assigned an evaporator 26, 28 or an evaporator element 60 of the evaporator 26, 28.

In the detail of the refrigerant circuit 36 according to FIG. 4, five evaporator elements 60 are provided by way of example for cooling five drive battery modules 24. The branch conduit 56 with the evaporator 26 is connected to the first outlet channel 14 of the refrigerant distributor 10, wherein the evaporator 26 comprises three evaporator elements 60. The evaporator 28 is connected via the branch conduit 58 to the second outlet channel 16 of the refrigerant distributor 10, wherein the evaporator 28 consists merely of two evaporator elements 60. As long as each drive battery module 24 requires the same cooling capacity, different cooling capacities $P_{K1}$, $P_{K2}$ are necessary in the branch conduits 56, 58. As has already been described above, said different cooling capacities $P_{K1}$, $P_{K2}$ can be achieved particularly preferably by way of different channel cross-sections $Q_{A1}$, $Q_{A2}$ of the outlet channels 14, 16 (see FIG. 1).

If, moreover, the branch conduit lengths of the branch conduits 56, 58 also differ, the lower conduit resistance of the shorter branch conduit 56, 58 can be compensated for particularly preferably by way of a flow resistor 62 in said shorter branch conduit 56, 58 (see FIGS. 1 to 3).

If, moreover, the refrigerant distributor 10 is installed at a mounting angle of β≥10° with respect to the vertical direction 30, for example for installation space reasons, the refrigerant distributor 10 is particularly preferably configured in such a way that the point of intersection S of the outlet axes $A_1$, $A_2$ is arranged offset laterally from the inlet axis E (see FIGS. 2 and 3).

Here, the stated measures for setting different cooling capacities $P_{K1}$, $P_{K2}$, for compensating for different lengths of the branch conduits 56, 58 and/or for compensating for a mounting angle can be used individually or in any desired combination, depending on requirements.

As a result, the cooling of the drive battery modules 24 to a desired temperature level with a small tolerance range can be ensured even when the evaporators 26, 28 which are connected in parallel are separated structurally from one another and are decoupled thermally, with the result that, for example, temperature compensation via thermal conduction is not possible.

The invention claimed is:

1. A refrigerant distributor of a motor vehicle, comprising:
   an inlet channel (12), which extends substantially linearly along an inlet axis (E) and has a channel cross-section ($Q_E$); and
   at least two outlet channels (14, 16) branching off from the inlet channel (12), which each extend substantially linearly along an outlet axis ($A_1$, $A_2$) and have a channel cross-section ($Q_{A1}$, $Q_{A2}$),
   wherein the outlet axis ($A_1$) of a first outlet channel (14) and the outlet axis ($A_2$) of a second outlet channel (16)

intersect in a point of intersection (S), wherein a baffle face (17) which is disposed perpendicularly with respect to the inlet axis (E) is provided between the first outlet channel (14) and the second outlet channel (16), wherein the refrigerant distributor (10) has the following features:

the point of intersection (S) of the outlet axes ($A_1$, $A_2$) is laterally offset from the inlet axis (E);

wherein the inlet channel (12) has a connecting portion (38) which adjoins an inlet port (32) and a branching portion (40) which adjoins the outlet channels (14, 16), and wherein the connecting portion (38) defines a port cross-section ($Q_E^*$) with a port axis (E*) and the branching portion (40) defines the channel cross-section ($Q_E$) narrowed as compared to the port cross-section ($Q_E^*$) with the inlet axis (E).

2. The refrigerant distributor according to claim 1, wherein all outlet channels (14, 16) radially branch off from an axial end of the inlet channel (12).

3. The refrigerant distributor according to claim 1, wherein the channel cross-section ($Q_E$) of the inlet channel (12) has an inlet diameter ($d_E$) with 4 mm≤$d_E$≤8 mm.

4. The refrigerant distributor according to claim 1, wherein each outlet channel (14, 16) extends from a branching point (18) to an outlet port (20, 22) and has a substantially constant channel cross-section ($Q_{A1}$, $Q_{A2}$).

5. The refrigerant distributor according to claim 1, wherein the channel cross-section ($Q_{A1}$) of the first outlet channel (14) differs from the channel cross-section ($Q_{A2}$) of the second outlet channel (16).

6. The refrigerant distributor according to claim 5, wherein the first outlet channel (14) has a first cooling capacity ($P_{K1}$) and the second outlet channel (16) has a second cooling capacity ($P_{K2}$) different from the first cooling capacity ($P_{K1}$), wherein $P_{K1}/P_{K2}=Q_{A1}/Q_{A2}$.

7. The refrigerant distributor according to claim 1, wherein the port axis (E*) extends through the point of intersection (S) of the outlet axes ($A_1$, $A_2$).

8. The refrigerant distributor according to claim 1, wherein the branching portion (40) has an axial length ($L_V$) and a hydraulic diameter ($d_{hydr,V}$), wherein 1 mm≤$L_V$≤3 $d_{hydr,V}$.

9. The refrigerant distributor according to claim 1, wherein the inlet channel (12) extends from an inlet port (32) to a branching point (18) and has a substantially constant channel cross-section ($Q_E$).

10. The refrigerant distributor according to claim 9, wherein the inlet channel (12) has an axial length ($L_E$) and a hydraulic diameter ($d_{hydr,E}$), wherein $d_{hydr,E}$≤$L_E$≤10 $d_{hydr,E}$.

11. A refrigerant circuit of a hybrid or electric vehicle, comprising:

at least two evaporators (26, 28) connected in parallel for cooling drive battery modules (24) of the vehicle, which each include a refrigerant inlet (42) and a refrigerant outlet (44);

a refrigerant distributor according to claim 1, which forms a branching point (18) with an inlet channel (12) and at least two outlet channels (14, 16);

a refrigerant collector (46), which forms a branching point (48) with a collector outlet (50) and at least two collector inlets (52, 54); and at least two branch conduits (56, 58) connected in parallel, which each extend from an outlet channel (14, 16) of the refrigerant distributor to a collector inlet (52, 54) of the refrigerant collector (46), wherein the evaporators (26, 28) each are connected to an associated branch conduit (56, 58), and wherein at the inlet and/or outlet of at least one evaporator (26, 28), a flow resistor (62) is provided for adapting the pressure drop in the associated branch conduit (56, 58).

12. The refrigerant circuit according to claim 11, wherein at the inlet and/or outlet, at least one evaporator (26, 28) is connected to the associated branch conduit (56, 58) via an intermediate flange (64), wherein the flow resistor (62) is integrated into the intermediate flange (64).

13. The refrigerant circuit according to claim 11, wherein the evaporators (26, 28) connected in parallel for cooling the drive battery modules (24) are separate evaporators (26, 28) which constructionally are separate from each other and are thermally decoupled.

14. The refrigerant distributor according to claim 1 wherein the point of intersection (S) of the outlet axes ($A_1$, $A_2$) laterally has a distance (x) from the inlet axis (E), wherein 0 mm<x≤2 mm.

* * * * *